G. STOCKER.
SPRING SHIELD AND OILING DEVICE.
APPLICATION FILED AUG. 29, 1921.
1,426,613.  Patented Aug. 22, 1922.
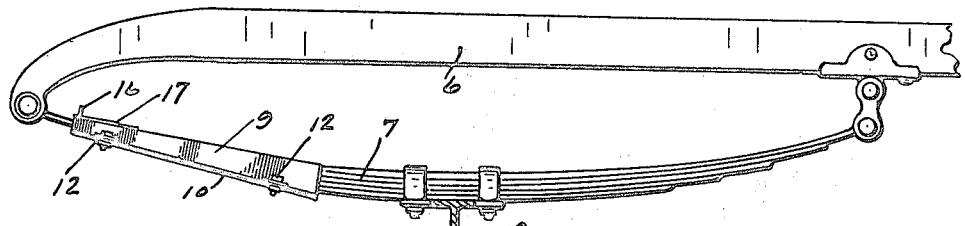
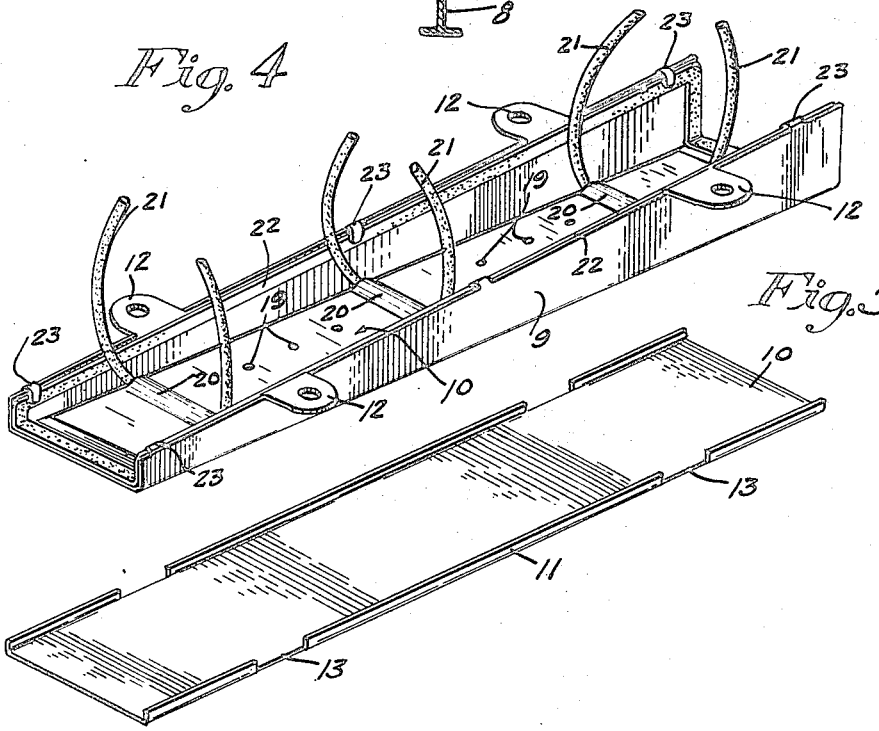
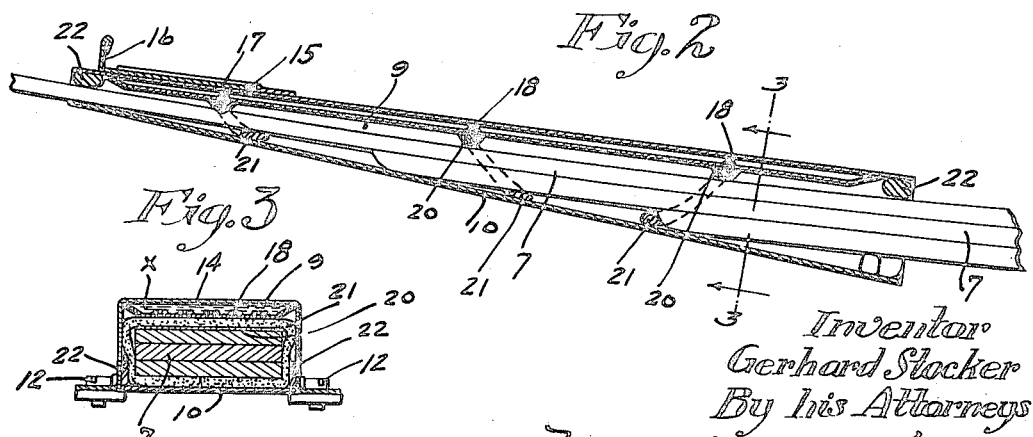
Inventor
Gerhard Stocker
By his Attorneys
Merchant & Kilgore

UNITED STATES PATENT OFFICE.

GERHARD STOCKER, OF MINNEAPOLIS, MINNESOTA.

SPRING SHIELD AND OILING DEVICE.

1,426,613.  Specification of Letters Patent.  Patented Aug. 22, 1922.

Application filed August 29, 1921. Serial No. 496,359.

*To all whom it may concern:*

Be it known that I, GERHARD STOCKER, am a citizen of the United States, residing at Minneapolis, in the county of Hennepin and State of Minnesota, have invented certain new and useful Improvements in Spring Shields and Oiling Devices; and I do hereby declare the following to be a full, clear, and exact description of the invention, such as will enable others skilled in the art to which it appertains to make and use the same.

My invention has for its object to provide an extremely simple and highly efficient leaf spring shield and oiling device and, to this end, it consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view of one of the frame side bars of an automobile having attached thereto a semi-elliptical leaf spring intermediately secured to a front axle and which spring has applied to its front end portion one of the improved devices;

Fig. 2 is a view of the spring and improved device partly in side elevation and partly in longitudinal central section, on an enlarged scale;

Fig. 3 is a transverse section taken on the line 3—3 of Fig. 2;

Fig. 4 is a perspective view of the device as shown in Fig. 2 removed from the spring, turned upside down and with the bottom plate removed therefrom; and Fig. 5 is a perspective view of the bottom plate.

The numeral 6 indicates the front end portion of one of the frame side bars of an automobile having a semi-elliptical leaf spring 7 attached thereto in the customary manner and which spring is intermediately secured to a front axle 8.

The improved spring shield and oiling device includes a casing-like shield 9 open at its ends and having a removable bottom plate 10. This shield 9 is adapted to be placed over the spring 7 and to thereafter have the bottom plate 10 secured thereto. Said bottom plate 10 is provided at its longitudinal edges with upturned flanges 11 which embrace the sides of the shield 9.

To attach the bottom plate 10 to the shield 9, pairs of outstanding perforated ears 12 are formed with the lower edges of the sides of the shield 9 and have secured thereto nut-equipped bolts 12, the nuts of which are arranged to be turned into underlapping engagement with the bottom plate 10 to hold the same in assembled relation to said shield. The flanges 11 hold the bottom plate 10 against transverse movement on the shield 9 and the ears 12 extend through notches 13 in said flanges and thereby hold the bottom plate 10 against endwise movement on said shield.

In the top of the shield 9 is a shallow oil reservoir 14, which, as shown, extends the full width of said shield and substantially the full length thereof. This oil reservoir 14 is filled with oil X through an opening 15 in the top of the shield 9 at the uppermost end thereof, and which opening is normally closed by a finger-piece-equipped slide 16 mounted in guides 17 on said top. In the bottom of the reservoir 14 is a plurality of transverse rows of oil escape holes 18 and between these oil holes 18 is a plurality of oil escape holes 19. Under each transverse row of oil holes 18 is a transverse loop 20 rigidly secured to the bottom of the oil reservoir 14 and through which is inserted a wick 21, the end portions of which hang down at the sides of the spring 7 and are held folded transversely under said spring by the bottom plate 10, as is best shown in Fig. 3.

A pliable packing strip 22, of felt or any other suitable material, is secured by clips 23 to the inner face of the sides of the shield 9 at the longitudinal edges thereof and which packing strips also extend upward on the sides of said shield at the ends thereof and across the top thereof, as best shown in Fig. 4. These joint strips 22 bear directly against the spring 7 and thereby form tight joints between the shield 9 and plate 10 to keep out dust and prevent the escape of oil from the device.

After the device is applied to the spring, the slide 16 is opened and the oil reservoir 14 filled with oil X through the opening 15. This oil X, under the action of the leaves of the spring 7 and the jar of the vehicle when in motion, will drip through the oil holes 18 and 19. The oil from the holes 18 will be precipitated directly onto the top of the spring 7 and from there will flow down the sides thereof and work in between the leaves of the spring under the movement thereof. Oil from the holes 19 will be absorbed by the wicks 21 and conveyed thereby down the sides of the spring 7 and onto the bottom thereof. The oil on the sides of the spring will work in between the leaves and the oil on the bottom thereof will flow to the ends of the leaves and work in therebetween. The wicks 21 on the bottom of the spring 7 will hold the oil in a multiplicity of pockets on the bottom of the plate 10, where it will be splashed onto the spring and further assist in lubricating the same.

The above described invention, while extremely simple and comparatively small cost to manufacture, can be very quickly applied to a spring or removed therefrom. Preferably, as shown in Figs. 2, 3 and 4 the oil holes 18 and 19 are punched from the underside of the oil reservoir which leaves the metal surrounding said holes, above the bottom of the reservoir and of substantially conical formation. The purpose of thus forming the oil holes 18 and 19 is to prevent the oil from flowing freely therethrough while the vehicle is standing but which oil will be worked through said hole under the action of the springs and the motion of the vehicle. It is, of course, understood that one of the devices will be applied to each end portion of a semi-elliptical spring, and, if desired, the device may be of sufficient length to extend from the eye in the spring to the shackle which holds the same on the axle. Preferably as shown the device is pressed from sheet metal.

What I claim is:

1. A device of the kind described comprising a casing applicable to a spring, a reservoir in the top of the casing extending the length thereof, and a plurality of wicks in the casing applied at different points along the spring.

2. A device of the kind described comprising a casing applicable to a spring, a closed reservoir in the top of the casing, and extending substantially the full length thereof, and a plurality of wicks in the casing arranged to be held transversely folded around a spring by the casing, said reservoir having oil holes leading to the wicks.

3. A device of the kind described comprising a casing applicable to a spring, an oil reservoir in the top of the casing, a plurality of transversely extended loops in the casing on the bottom of the reservoir, and wicks intermediately held by the loops and arranged to be held folded transversely around a spring by the casing, said reservoir having oil holes, certain of which are arranged over the loops and certain other of which are between said loops.

4. A device of the kind described comprising a casing having open ends and a removable bottom plate, an oil reservoir in the top of the casing, a plurality of longitudinally spaced wicks in the casing on the bottom of the reservoir, said reservoir having oil holes over the wicks, said wicks being arranged to hang down between the sides of the casing and a spring and to be held against the bottom of the spring by the removable bottom plate.

5. A device of the kind described including a casing having open ends and a removable bottom plate, said bottom plate having longitudinal retaining flanges arranged to interlock with the sides of the casing, outstanding ears on the casing, said flanges having notches arranged to receive said outstanding ears and hold the bottom plate against endwise movement on the casing, and fastening devices carried by the outstanding ears for holding the casing and bottom plate in assembled relation.

6. A device of the kind described including a casing having open ends and a removable bottom plate, said bottom plate having longitudinal retaining flanges arranged to interlock with the sides of the casing, outstanding ears on the casing, said flanges having notches arranged to receive said outstanding ears and hold the bottom plate against endwise movement on the casing, fastening devices carried by the outstanding ears for holding the casing and bottom plate in assembled relation, and a packing strip in endless arrangement secured to the casing at its edge portions for engagement with the removable bottom plate to form a tight joint between the casing and said bottom plate.

In testimony whereof I affix my signature.

GERHARD STOCKER.